United States Patent
Wakayama et al.

(10) Patent No.: US 9,019,969 B2
(45) Date of Patent: Apr. 28, 2015

(54) GATEWAY FOR INTERCONNECTING A WIRELESS ACCESS FUNCTION WITH A NETWORK ACCESS FUNCTION

(75) Inventors: Koji Wakayama, Tokyo (JP); Kazuhito Yaegashi, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 650 days.

(21) Appl. No.: 12/458,473

(22) Filed: Jul. 14, 2009

(65) Prior Publication Data

US 2010/0014532 A1 Jan. 21, 2010

(30) Foreign Application Priority Data

Jul. 18, 2008 (JP) .................................. 2008-186987

(51) Int. Cl.
*H04L 12/46* (2006.01)
*H04L 12/66* (2006.01)

(52) U.S. Cl.
CPC ............ *H04L 12/4633* (2013.01); *H04L 12/66* (2013.01)

(58) Field of Classification Search
USPC .......................................................... 370/401
See application file for complete search history.

(56) References Cited

U.S. PATENT DOCUMENTS

| 2003/0161334 | A1* | 8/2003 | Pellert | 370/401 |
| 2004/0165581 | A1* | 8/2004 | Oogushi | 370/352 |
| 2008/0028077 | A1 | 1/2008 | Kamata et al. | |
| 2008/0117884 | A1* | 5/2008 | Ishii et al. | 370/338 |
| 2008/0159227 | A1 | 7/2008 | Ulupinar et al. | |
| 2008/0214189 | A1* | 9/2008 | Taaghol | 455/432.2 |
| 2010/0278122 | A1* | 11/2010 | Singh et al. | 370/329 |

FOREIGN PATENT DOCUMENTS

| JP | 2001-203740 | 7/2001 |
| JP | 2008-35037 | 2/2008 |
| JP | 2004-187282 | 2/2009 |
| JP | 2010-510728 | 4/2010 |

OTHER PUBLICATIONS

Office Action issued Sep. 11, 2012 in corresponding Japanese application No. 2008-186987.

* cited by examiner

*Primary Examiner* — Ayaz Sheikh
*Assistant Examiner* — Tarell Hampton
(74) *Attorney, Agent, or Firm* — Bacon & Thomas, PLLC (57) ABSTRACT

A gateway for interconnecting different networks includes a network access means for interconnecting a first network that provides a wireless access function to a mobile station with a second network that provides a network access function to the mobile station. The gateway further includes a first tunnel establishment means for establishing, in the first network, a first tunnel between the gateway and a base station accessing one or more mobile stations via wireless communications, for transmission of different packets to the respective mobile stations. The gateway further includes a second tunnel establishment means for establishing a second tunnel between the gateway and the second network, for packet transmission, a tunnel-mobile station connecting means for connecting the first tunnel with the mobile station, and a tunnel-to-tunnel interworking means for interworking the second tunnel with the first tunnel.

7 Claims, 9 Drawing Sheets

| | 516a-1 | 516a | 516a-2 |
|---|---|---|---|
| | ISP | AAA USER ADDRESS | |
| | ISP0 | | |
| | ISP1 | | |
| | ISP2 | | |
| | ISP3 | | |
| | | | |
| | | | |

FIG.10

| PASS ID (522a-1) | ISP (522a-2) | TUNNEL NUMBER (522a-3) |
|---|---|---|
| 1 | ISP0 | 000 |
| 2 | ISP1 | 110 |
| 3 | ISP2 | 210 |
| 4 | ISP3 | 310 |
| 5 | ISP3 | 320 |
| | | |

FIG.11

| TUNNEL NUMBER (522b-1) | POINTER (522b-2) | OUTPUT PHYSICAL LINK (522b-3) |
|---|---|---|
| 000 | adr0 | 0 |
| 110 | adr1 | 0 |
| 210 | adr2 | 1 |
| 310 | adr3 | 2 |
| 320 | adr4 | 2 |
| | | |

FIG.12

| 522c-1 | 522c |
|---|---|
| adr0 | ENCAPSULATION HEADER OF TUNNEL 000 |
| adr1 | ENCAPSULATION HEADER OF TUNNEL 110 |
| adr2 | ENCAPSULATION HEADER OF TUNNEL 210 |
| adr3 | ENCAPSULATION HEADER OF TUNNEL 310 |
| adr4 | ENCAPSULATION HEADER OF TUNNEL 320 |
|  |  |

| DESTINATION IP ADDRESS | TUNNEL NUMBER |
|---|---|
| 10.5.0.102 | 5 |
| 10.10.20.150 | 10 |
| 10.15.14.123 | 15 |
|  |  |

| TUNNEL NUMBER (522e-1) | POINTER (522e-2) | OUTPUT PHYSICAL LINK (522e-3) |
|---|---|---|
| 5 | adr10 | 2 |
| 10 | adr11 | 3 |
| 15 | adr12 | 4 |
|  |  |  |

| (522f-1) | (522f-2) |
|---|---|
| adr10 | ENCAPSULATION HEADER OF TUNNEL 5 |
| adr11 | ENCAPSULATION HEADER OF TUNNEL 10 |
| adr12 | ENCAPSULATION HEADER OF TUNNEL 15 |
|  |  |

522f

GATEWAY FOR INTERCONNECTING A WIRELESS ACCESS FUNCTION WITH A NETWORK ACCESS FUNCTION

FIELD OF THE INVENTION

The present invention relates to, e.g., a packet communications device, and more particularly, to a gateway interconnecting different networks.

BACKGROUND OF THE INVENTION

For example, because of the limited radio resources, the number of network operators who can have a frequency license is limited. Those who do not have the frequency license may lease equipments such as a radio base station to provide mobile communications services. Thus, operators who do not necessarily own equipments such as radio base stations, networks or the like, but still provide mobile communications services by leasing them from mobile network operators (MNOs) who actually own those equipments to execute mobile communications services such as cellular phones are called mobile virtual network operators (MVNOs).

WiMAX Forum which is the standard committee that defines common specifications of radio system based on the IEEE802.16 standard establishes a network reference model (WiMAX Forum Network Architecture).

In the WiMAX Forum's network reference model, networks are classified into network access providers who are operators providing a radio access to mobile stations, and network service providers who provide an internet protocol (IP) access to mobile stations.

As one example of embodiments for MVNO, MNO may be designated as a network access provider in the WiMAX Forum network reference model, and MVNO may be designated as a network service provider in the WiMAX Forum network reference model.

[Patent Document 1] Japanese Patent Laid-open Publication No. 2008-035037

[Patent Document 2] Japanese Patent Laid-open Publication No. 2004-187282

However, in a network apparatus (hereinafter, referred to as a gateway) which interconnects a network of an MNO with a network of an MVNO, it is necessary to execute communications having a closed area property between a device (mobile station) of a user that executes a network access and the MVNO with which the user enters into a contract. That is, at an initial access of a mobile station, user authentication needs to be performed between the mobile station and an authentication server which is managed by the MVNO with which the user enters into a contract. In addition, when the mobile station executes communications with a network, it is necessary to transmit a packet sent from the mobile station only to the network of the MVNO with which the user enters into a contract.

SUMMARY OF THE INVENTION

In view of the above, the present invention provides a gateway which, in case of interconnecting an MNO with an MVNO, can perform communications having a closed area property between a user and the MVNO with which the user enters into a contract.

In accordance with an embodiment of the present invention, there is provided a gateway for interconnecting different networks, comprising: a network access means for interconnecting a first network that provides a wireless access function to a mobile station and a second network that provides a network access function to the mobile station; and a first tunnel establishment means for establishing, in the first network, a first tunnel between the gateway and a base station accessing one or more mobile stations via wireless communications, for transmission of different packets to the respective mobile stations. The gateway further comprises a second tunnel establishment means for establishing a second tunnel between the gateway and the second network, for packet transmission; a tunnel-mobile station connecting means for connecting the first tunnel with the mobile station; and a tunnel-to-tunnel interworking means for interworking the second tunnel with the first tunnel.

Thus, for example, when an MNO and an MVNO are interconnected, a gateway capable of performing communications having a closed area property between a user and the MVNO with which the user enters into a contract can be realized.

Here, various types of sources can be used as the mobile station, the base station, the first network, the second network, the first tunnel, and the second tunnel.

Also, the tunnel-mobile station connecting means or the tunnel-to-tunnel interworking means may be configured with, e.g., a table stored in a memory.

The gateway may have an indirect system as follows.

That is, the network access means interconnects the first network with the second network via a third network. The second tunnel establishment means establishes the second tunnel between the gateway and the second network, the second tunnel going through the third network. The third network interconnects the second network including at least one different network.

Accordingly, it is possible to correspond not only to the direct system, but also to the indirect system.

Here, various types of sources can be used as the third network.

The gateway may further include a transmission control means, which interworks the first tunnel with the second tunnel in one-to-one correspondence with reference to interworking of the tunnel-to-tunnel interworking means, transmits a packet sent by using the first tunnel to the corresponding second network by using the second tunnel that is interworked with the corresponding first tunnel, and transmits a packet sent by using the second tunnel from the second network to the corresponding first network by using the first tunnel that is interworked with the corresponding second tunnel.

Therefore, based on the interworking of the first tunnel with the second tunnel, packets from the first network side (the first tunnel side) may be transmitted to the second network side (the second tunnel side), or packets from the second network side (the second tunnel side) may be transmitted to the first network side (the first tunnel side).

Furthermore, this packet transmission process may be applied not only to the direct system, but also to the indirect system.

As explained so far, in case of interconnecting an MNO with an MVNO for instance, the gateway in accordance with the embodiment of the present invention can perform communications having a closed area property between itself and the MVNO with which the user enters into a contract.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Hereinafter, embodiments of the present invention will be explained in detail with reference to the accompanying drawings.

Figure 1:
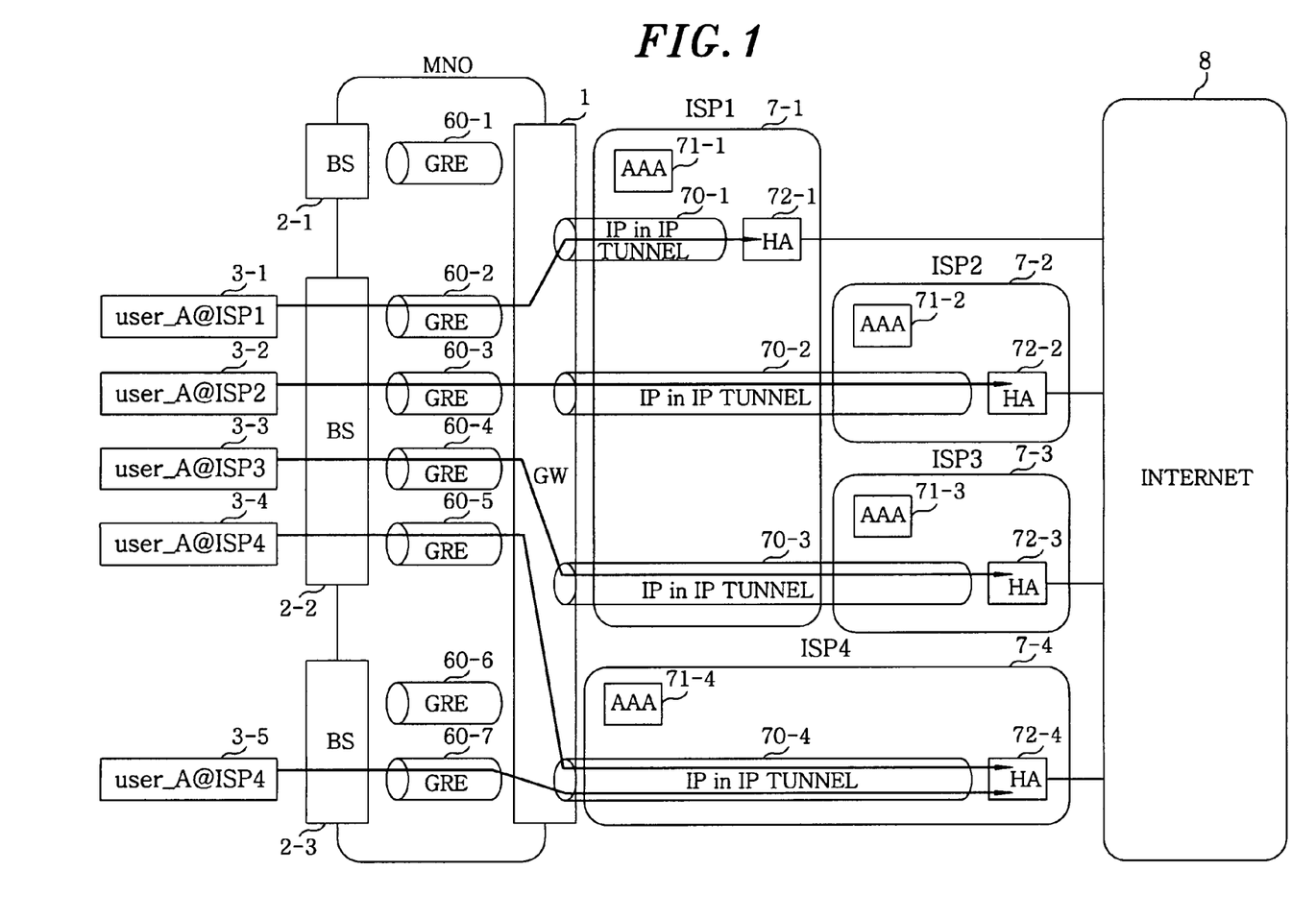
FIG. 1 shows a configuration of a network system in accordance with an embodiment of the present invention.

FIG. 1 shows a configuration of a network system in accordance with an embodiment of the present invention.

A gateway (GW) 1 is a packet communications apparatus for interconnecting a mobile network operator (MNO) 6 with internet service providers (ISPs) 7-1 and 7-4. Also, ISPs 7-2 and 7-3 are connected to the MNO 6 via the ISP 7-1.

The MNO 6 is provided with base stations (BSs) 2-1, 2-2 and 2-3 which can wirelessly access mobile stations 3-1 to 3-5, and the GW 1.

Tunnels for transmission of internet protocol (IP) packets are set up between the BSs 2-1, 2-2 and 2-3 and the GW 1. In the example shown in FIG. 1, generic routing encapsulation (GRE) tunnels 60-1 to 60-7 are set up.

The ISPs 7-1 to 7-4 include authentication servers (AAAs) 71-1 to 71-4, and home agents (HAs) 72-1 to 72-4 provided at endpoints of tunnels that are set up between the GW 1 and the HAs 72-1 to 72-4, respectively. In the example shown in FIG. 1, IP-in-IP tunnels 70-1 to 70-4 are set up as the tunnels that are set up between the GW 1 and the HAs 72-1 to 72-4.

Further, the HAs 72-1 to 72-4 are connected to an internet 8.

In this embodiment, it is assumed that the ISP 7-1 is operated by the same operator as the MNO 6. Also, in this embodiment, it is assumed that the ISPs 7-2, 7-3 and 7-4 are operated by a mobile virtual network operator (MVNO).

Figure 2:
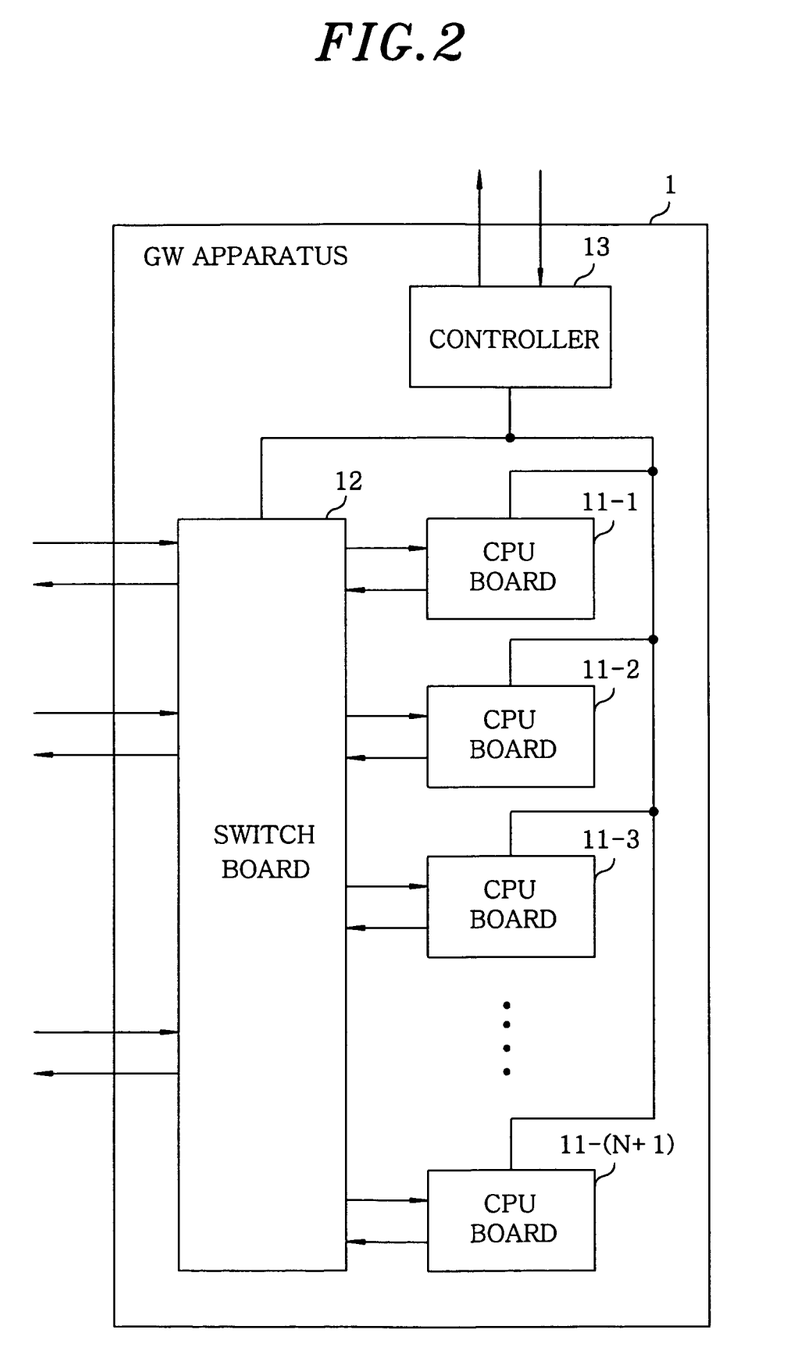
FIG. 2 shows a configuration of a gateway.

FIG. 2 shows a configuration of the GW 1. The GW 1 in accordance with this embodiment includes central processing unit (CPU) boards 11-1 to 11-(N+1), a switch board 12, and a controller 13.

Each of the CPU boards 11-1 to 11-(N+1) performs processing involved in packet transmission, user session establishment, and user session information management.

The switch board 12 performs input/output with a physical link, and distribution to the CPU boards 11-1 to 11-(N+1).

The controller 13 controls the CPU boards 11-1 to 11-(N+1), and the switch board 12.

Here, as in this embodiment, by loading plural CPU boards 11-1 to 11-(N+1), it is possible to realize load balancing in the CPU boards, and redundancy for processing switching among the CPU boards in the event of a failure.

Figure 3:
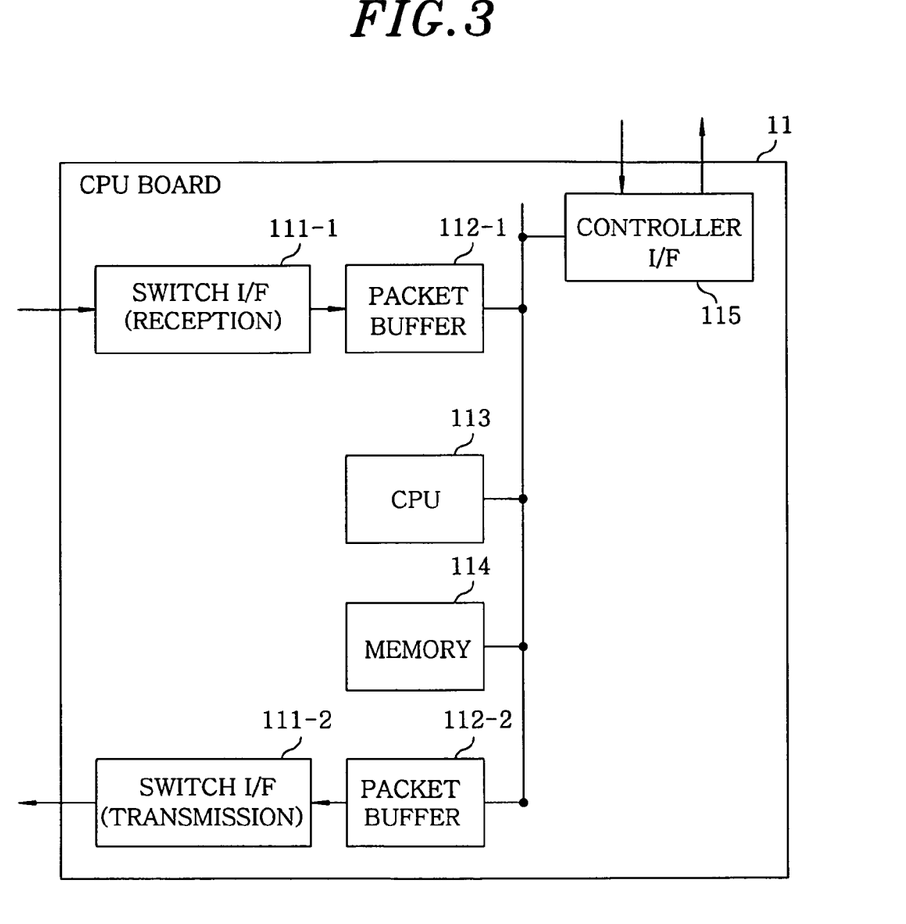
FIG. 3 shows a configuration of a CPU board.

FIG. 3 shows a configuration of the CPU boards 11-1 to 11-(N+1) mounted in the GW 1. Further, the CPU boards 11-1 to 11-(N+1) will be represented by the CPU board 11 for explanation since they have the same configuration.

The CPU board 11 includes a switch interface (switch I/F) 111-1 on a reception side, and a switch interface (switch I/F) 111-2 on a transmission side. The CPU board 11 further includes a packet buffer 112-1 on the reception side, a packet buffer 112-2 on the transmission side, a CPU 113, a memory 114, and a controller interface (controller I/F) 115.

The switch I/Fs 111-1 and 111-2 are I/O interfaces with the switch board 12. The switch I/F 111-1 receives packets from the switch board 12, and the switch I/F 111-2 transmits packets to the switch board 12.

The packet buffers 112-1 and 112-2 accumulate packets that are processed by the CPU board 11. The packet buffer 112-1 accumulates received packets, and the packet buffer 112-2 accumulates transmitted packets.

The CPU 113 performs processes involved in packet forwarding, user session establishment, and user session management.

The memory 114 is a work area for the CPU 113, and maintains a session management table that manages information on the user session.

The controller I/F 115 is an interface that interfaces with the controller 13.

Figure 4:
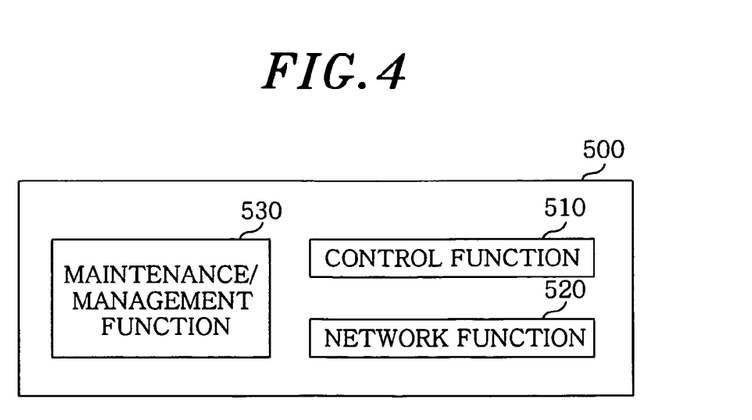
FIG. 4 shows an example of function blocks of software.

FIG. 4 shows an example of function blocks in accordance with a software 500 that is loaded on the CPU board 11 of the GW 1.

The function blocks in accordance with the software 500 includes a control function block 510, a network function block 520, and a maintenance/management function block 530.

The control function block 510 mainly performs control plane processing such as user authentication, tunnel setup or the like.

The network function block 520 mainly performs user plane processing such as packet transmission or the like.

The maintenance/management function block 530 mainly performs maintenance/management processing such as setup from outside or the like, through communications with the controller 13.

Figure 5:
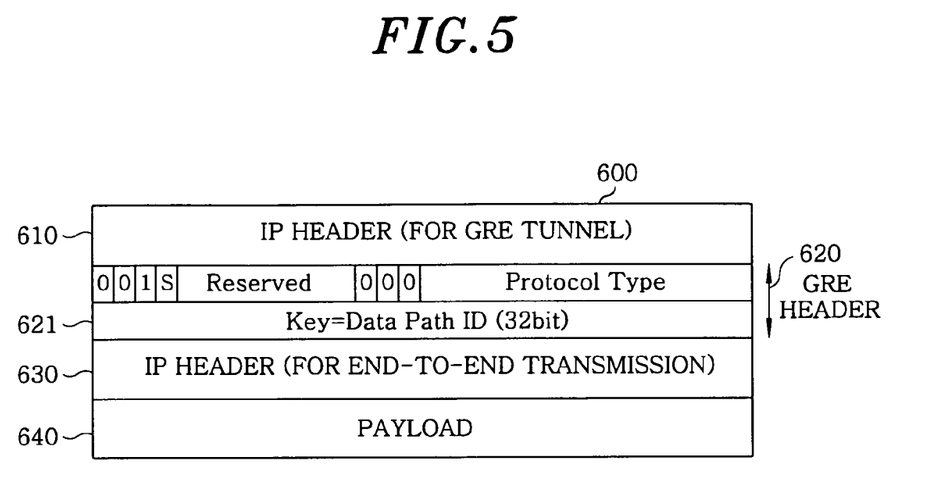
FIG. 5 shows a format of a GRE tunnel (encapsulation) packet.

FIG. 5 shows a format example of a GRE tunnel packet 600. This is obtained by performing encapsulation by using information on an encapsulation header.

An IP header 610, which is used for packet transmission in a tunnel session, is provided at the head of the GRE tunnel packet 600. Following this IP header 610 used for packet transmission, a GRE header 620 is provided. A GRE key 621 is set up for the GRE header 620. The GRE key 621 is the information used for tunnel identification. Following the GRE header 620, an IP header 630 for end-to-end packet transmission and a payload 640 are set up.

Figure 6:
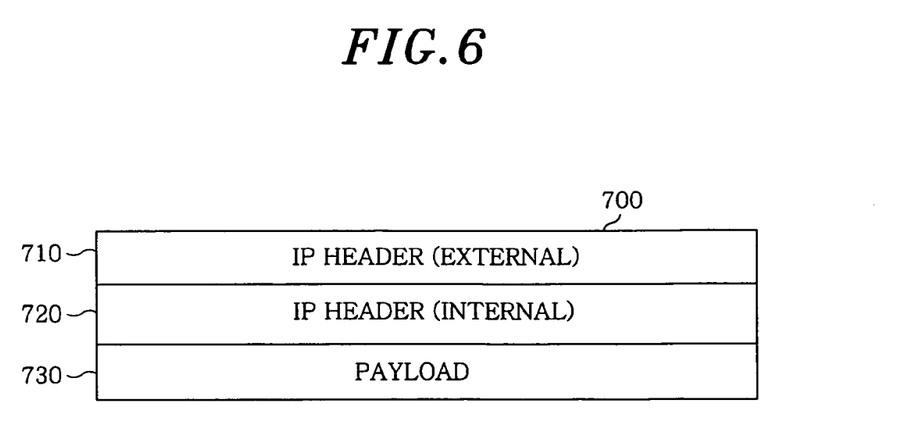
FIG. 6 shows a format of an IP in IP tunnel (encapsulation) packet.

FIG. 6 shows a format example of an IP in IP tunnel packet 700. This is obtained by performing encapsulation by using information on an encapsulation header.

An external IP header 710, which is used for packet transmission in a tunnel session, is provided at the head of the IP in IP tunnel packet 700. Following this external IP header 710, an internal IP header 720 for end-to-end packet transmission and a payload 730 are set up.

In this format, the external IP header 710 corresponds to the encapsulation header.

Figure 7:
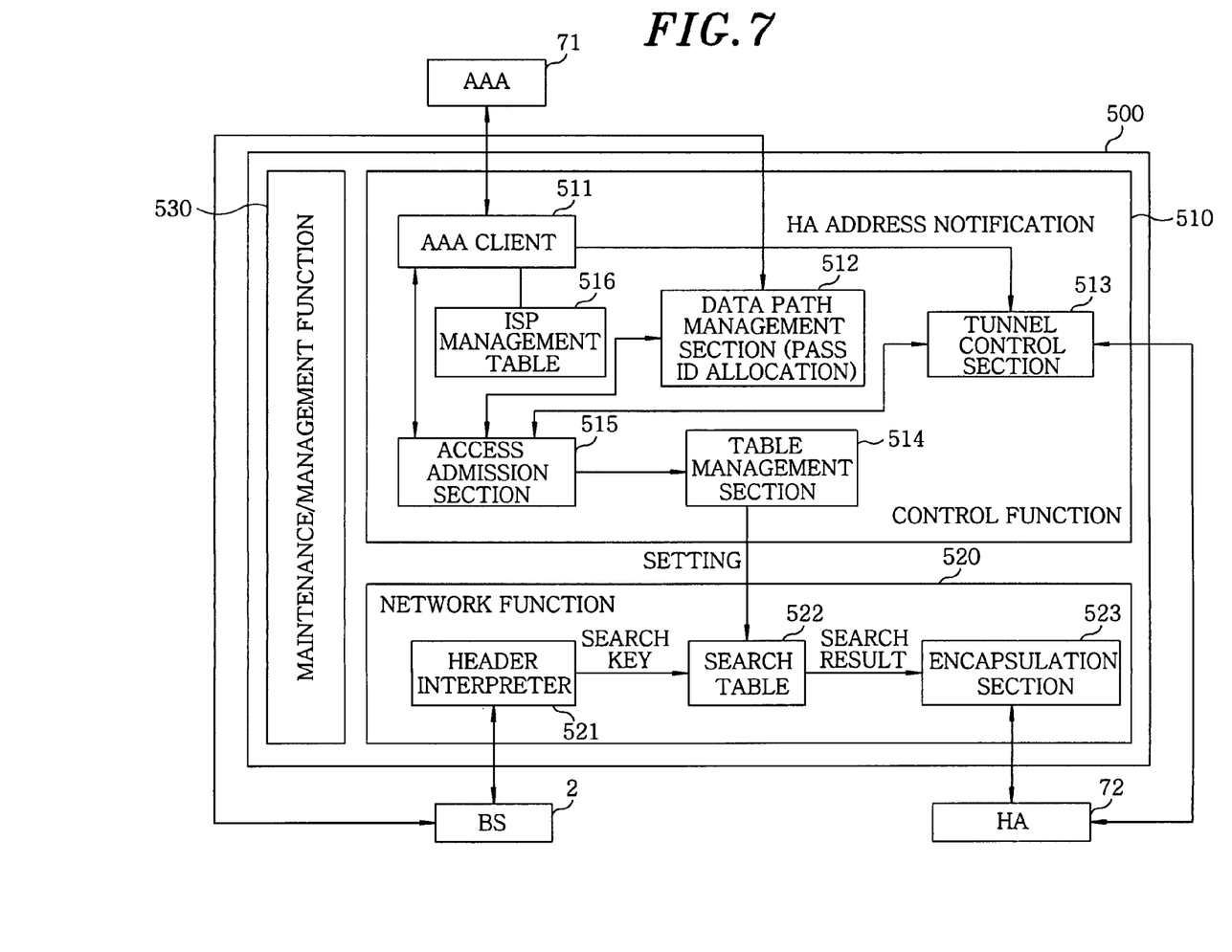
FIG. 7 shows a detailed example of function blocks of software.

FIG. 7 shows a detailed view of the function blocks in accordance with the software 500, which are in charge of performing the processing for executing communications, particularly, from the MNO 6 to the ISPs 7-1 to 7-4 (collectively, designated as the ISP 7).

The control function block 510 includes an AAA client 511, a data path management section 512, a tunnel control section 513, a table management section 514, an access admission section 515, and an ISP management table 516.

The AAA client 511 performs communications for user authentication between the authentication servers 71-1 to 71-4 (collectively, designated as the authentication server 71).

The ISP management table 516 manages address information of the authentication server AAA 71 with which the AAA client 511 performs communications for user authentication.

The data path management section 512 manages tunnels which are set up between the BSs 2-1 to 2-3 (collectively, designated as the BS 2) and the GW 1, for packet transmission in the network of the MNO 6. For instance, it allocates a path ID.

The tunnel control section 513 controls tunnels that are set up between the GW 1 and the HAs 72-1 to 72-4 (collectively, designated as the HA 72), for packet transmission between the GW 1 and the network of the ISP 7. Moreover, an address of the HA 72, i.e., HA address is notified from the AAA client 511 to the tunnel control section 513.

The table management section 514 produces contents of a search table 522 which is provided in the network function block 520, and performs the set-up of the search table 522.

The access admission section 515 accepts a user access.

The network function block 520 includes a header interpreter 521, the search table 522, and an encapsulation section 523.

The header interpreter 521 interprets the header of a packet transmitted through the tunnel that is set up between the BS 2 and the GW 1 for packet transmission in the network of the MNO 6, and extracts an ID of the tunnel.

The search table 522 establishes a relationship between the tunnel ID extracted by the header interpreter 521 and a transmission channel of a packet to which the tunnel ID is given. By setting the inputted tunnel ID as a search key, it outputs information on a corresponding packet transmission channel as a search result.

The encapsulation section 523 performs encapsulation for tunnel, based on the search result of the search table 522, in which the tunnel is used for packet transmission between the GW 1 and the HA 72.

Next, the processing at a time of a user's initial access will be explained.

Figure 8:
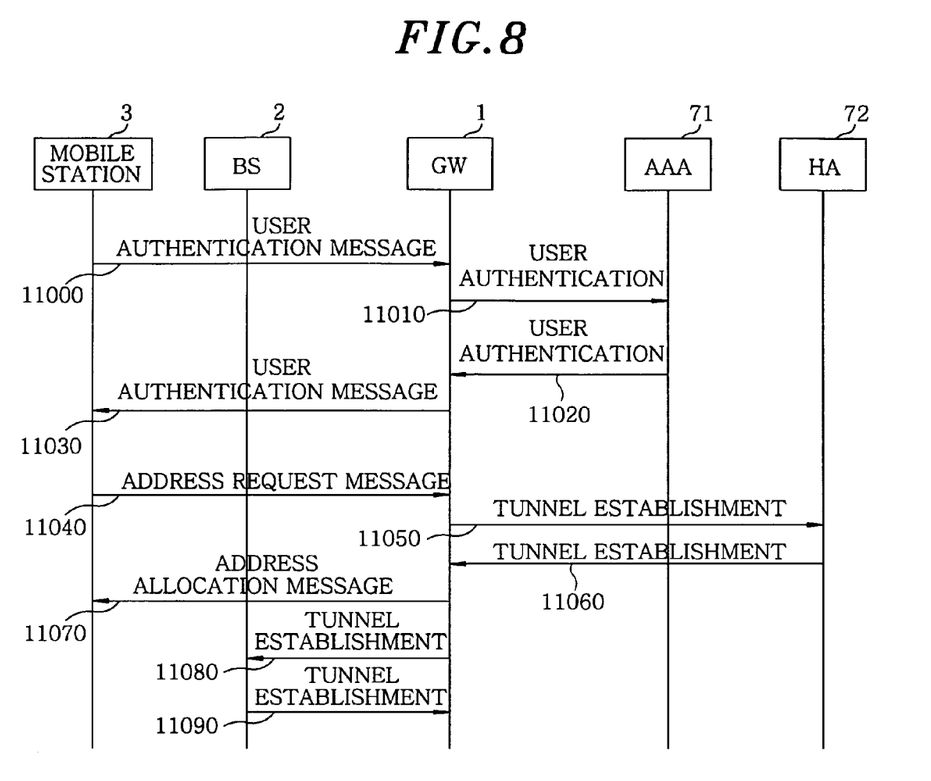
FIG. 8 shows an example of the sequence at the time of a user's initial access.

FIG. 8 shows an example of the sequence at the time of the user's initial access.

The mobile stations 3-1 to 3-5 (collectively, designated as the mobile station 3), which are manipulated by the user, send a user authentication message 11000 to the GW 1 via the BS 2. The GW 1 transmits/receives control messages 11010 and 11020 to/from the authentication server AAA 71, thereby performing user authentication processing for the mobile station 3. At this time, for the mobile station 3, the authentication server 71 notifies the address of the HA 72, serving as an endpoint of the tunnel that is set up between itself and the GW 1, to the GW 1 by using the control message 11020. The GW 1 sends a user authentication message 11030 to the mobile station 3.

The mobile station 3 sends a message 11040 to the GW 1 to request an address to be set in the mobile station 3. The GW 1 sends a control message 11050 to the HA 72 to perform tunnel establishment between itself and the HA 72 of the address that is notified via the control message 11020 of user authentication. The HA 72 sends the GW 1 a control message 11060 for setting an address that is allocated to the mobile station 3. In this way, a tunnel for packet transmission is established between the GW 1 and the HA 72.

An address that is allocated to the mobile station 3 is notified to the GW 1 by using the control message 11060, and the GW 1 notifies the address to the mobile station 3 by using a control message 11070.

By transmitting and receiving control signals 11080 and 11090 between the GW 1 and the BS 2, the GW 1 establishes a tunnel for packet transmission between itself and the BS 2.

Referring to FIG. 7, one example of the flow of software processing at the time of the user's initial access will be explained.

At the time of the user's initial access, the access admission section 515 of the control function block 510 receives the user authentication signal 11000 that is sent from the mobile station 3. Then, the access admission section 515 transmits this control signal (i.e., the user authentication signal) 11000 to the AAA client 511. The AAA client 511 identifies, based on the identifier information of the user authentication signal 11000, a user who uses the mobile station 3 and an ISP to which the corresponding user belongs.

The ID information is also called a network access identifier (NAI) and expressed in abc@xyz form. Here, 'abc' indicates information to identify a user who needs to be authenticated and 'xyz' indicates information to identify an ISP to which the user 'abc' belongs.

Figure 9:
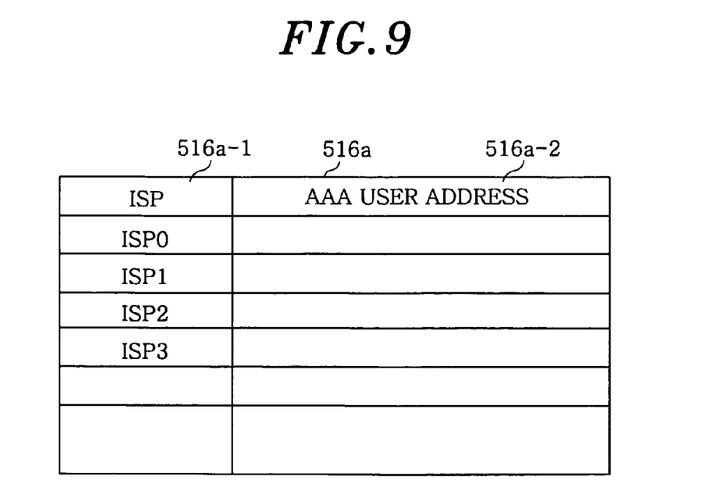
FIG. 9 shows an example of an ISP management table.

FIG. 9 shows a configuration of the ISP management table 516 (here, denoted as reference numeral '516a').

The ISP management table 516a in this example stores a name 516a-1 of the ISP identified by the NAI, and an address 516a-2 of the authentication server (AAA server) 71 of the corresponding ISP.

The AAA client 511 acquires the address 516a-2 of the AAA server 71 that corresponds to the ID information through searching the ISP management table 516, and performs communications for user authentication between itself and the corresponding AAA server 71.

When the processing of user authentication for the mobile station 3 is completed, tunnels are established between the GW 1 and the corresponding HA 72, and between the GW 1 and the corresponding BS 2. In this case, the address of the HA 72 that corresponds to the ID information is notified to the tunnel control section 513.

Now, a procedure for establishing the tunnel between the GW 1 and the HA 72 will be explained.

In the sequence shown in FIG. 8, after the mobile station 3 receives the control signal 11030, it sends the address request signal 11040. When the access admission section 515 in the control function block 510 receives the address request signal from the mobile station 3, it instructs the tunnel control section 513 to start the control of tunnel establishment. The control signals 11050 and 11060 for tunnel establishment are exchanged between the tunnel control section 513 and the HA 72. At this time, the HA 72 sets the address allocated to the mobile station 3 for the control signal 11060. When the tunnel is established between the GW 1 and the HA 72, the tunnel control section 513 sends the signal 11070 for setting the address allocated to the mobile station 3.

Next, a procedure for establishing the tunnel between the GW 1 and the BS 2 will be explained.

The access admission section 515 instructs the data path management section 512 to start the control of GRE tunnel establishment between the GW 1 and the BS 2. The control signals 11080 and 11090 for GRE tunnel establishment are exchanged between the data path management section 512 and the BS 2. At this time, the data path management section 512 determines a path ID to be allocated to each GRE tunnel, and notifies it to the BS 2 by using the control signal 11080. Here, the path ID corresponds to the GRE key 621 which is set up at the GRE header 620 of the GRE tunnel packet (GRE encapsulation packet) 600 shown in FIG. 5.

The access admission section 515 acquires, from the data path management section 512, path ID information for identifying the tunnel that is established between the GW 1 and the BS 2. Also, the access admission section 515 acquires, from the tunnel control section 513, information on the tunnel that is established between the GW 1 and the HA 72.

When the user authentication, tunnel establishment between the GW 1 and the HA 72 and tunnel establishment between the GW 1 and the BS 2 are completed, the access admission section 515 instructs the table management section 514 to create the search table 522 which is used for the network function block 520 to transmit a data packet. At this time, the access admission section 515 notifies the table management section 514 of the path ID information for identifying the tunnel that is established between the GW 1 and the BS 2, and the information on the tunnel that is established between the GW 1 and the HA 72.

Next, the processing in the GW 1 during the data communications of the mobile station 3 will be explained. In particular, uplink communications from the mobile station 3 to the BS 2 will be explained.

Figure 10:
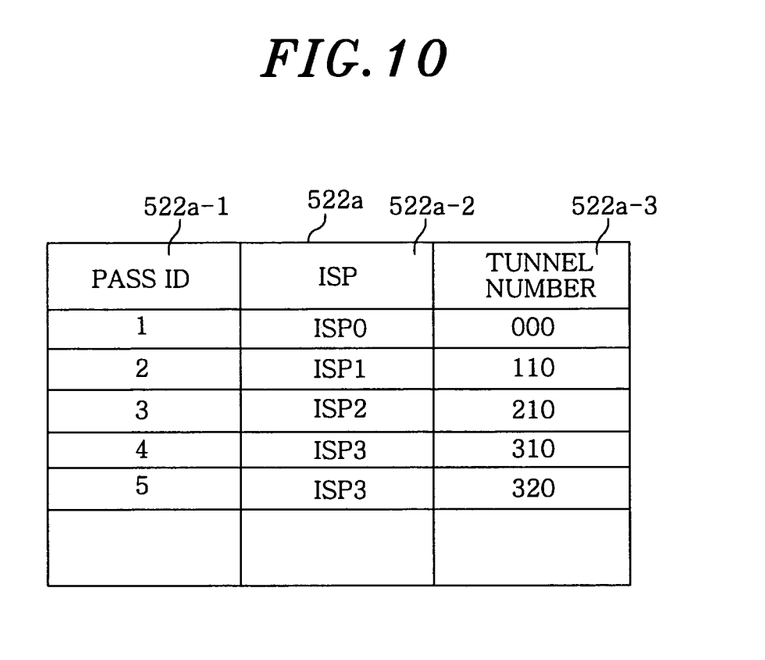
FIG. 10 shows a configuration of a search table used for uplink communications in the gateway.
Figure 11:
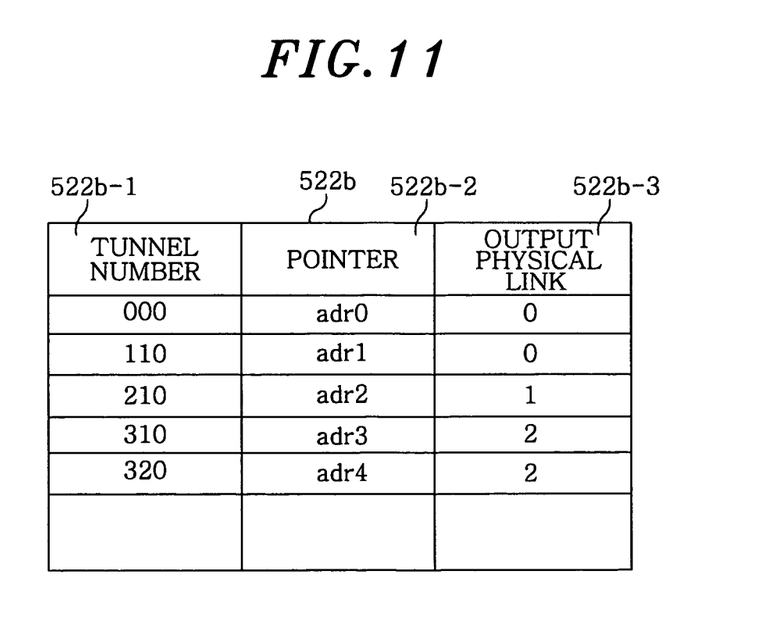
FIG. 11 shows another configuration of a search table used for uplink communications in the gateway.
Figure 12:
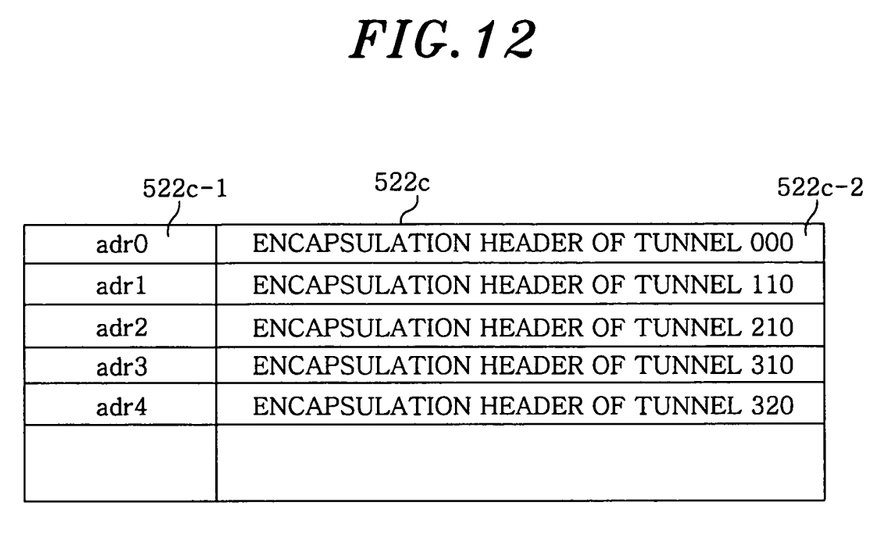
FIG. 12 shows still another configuration of a search table used for uplink communications in the gateway.

In this example, as shown in FIG. 10, FIG. 11 and FIG. 12, the search table 522 used for uplink communications is logically divided.

A table 522a shown in FIG. 10 (which is a part of the search table 522) stores, in a corresponding manner, a path ID 522a-1, ID information 522a-2 of the ISP to which the user who sent a corresponding packet belongs, and identifier's information of a tunnel (tunnel number in this example) 522a-3 as the transmission channel of the corresponding packet.

The header interpreter 521 retrieves the table 522a by using the path ID 522a-1, which is the information for identifying the tunnel established between the GW 1 and the BS 2, as a search key. Here, in this example, the GRE key 621 that is set up at the GRE header 620 of the GRE tunnel packet (GRE encapsulation packet) 600 shown in FIG. 5 is used as the path ID 522a-1. As a result, the header interpreter 521 acquires the ID information 522a-2 of ISP and tunnel number 522a-3.

The table 522b shown in FIG. 11 (which is a part of the search table 522) stores, in a corresponding manner, identifier's information of a tunnel serving as the packet transmission channel (tunnel number in this example) 522b-1, an address pointer 522b-2, and information on a physical link 522b-3 for outputting a corresponding packet.

The header interpreter 521 uses the tunnel number 522b-1 (corresponding to 522a-3 in FIG. 10), which is obtained by retrieving the table 522a, as a search key to retrieve the table 522b. As a result, the header interpreter 521 acquires the address pointer 522b-2 in the table (522c of FIG. 12) that sets information of the encapsulation header, and the physical link's information 522b-3 of the GW 1 that outputs a corresponding packet.

The table 522c shown in FIG. 12 (which is a part of the search table 522) stores, in a corresponding manner, an address represented as a value 522c-1 of an address pointer that is obtained by retrieving the table 522b shown in FIG. 11, and information 522c-2 of the encapsulation header which is given to a packet in the tunnel established between the GW 1 and the HA 72.

The header interpreter 521 uses a value 522b-2 of the address pointer, which is obtained by retrieving the table 522b, as a search key to retrieve the table 522c. Here, in the table 522b, the address pointer's value 522b-2 corresponds to the address 522c-2 in the table 522c one to one.

As a result of retrieving the table 522c, the header interpreter 521 acquires the information 522c-2 of the encapsulation header that is given to a packet in the tunnel established between the GW 1 and the HA 72.

The encapsulation section 523 gives the encapsulation header's information 522c-2 that is given to a packet in the tunnel established between the GW 1 and the HA 72, which is obtained as the header interpreter 521 retrieves the table 522b, to the packet to send it the corresponding HA 72.

So far, it has been explained about uplink communications, i.e., the processing in the GW 1 for packet transmission through the mobile station 3, the GW 1 and the HA 72 in this order. Similar to this, it is also possible to perform downlink communications, i.e., the processing in the GW 1 for packet transmission through the HA 72, the GW 1, and the mobile station 3 in this order.

To be more specific, for the downlink communications from the BS 2 to the mobile station 3, the processing in the GW 1 during the data communications of the mobile station 3 will be described.

Figure 13:
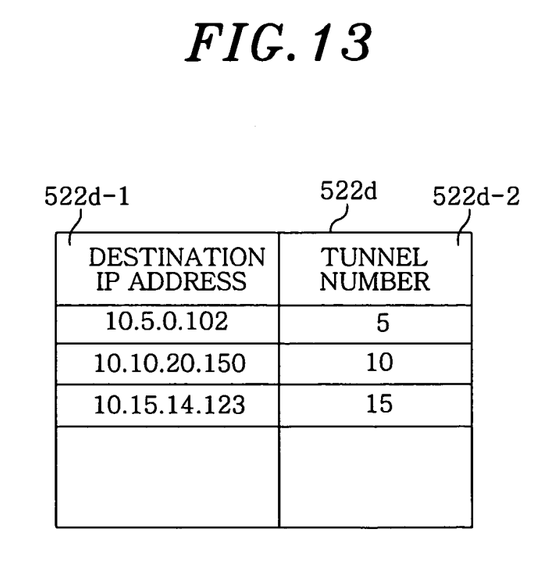
FIG. 13 shows a configuration of a search table used for downlink communications in the gateway.
Figure 14:
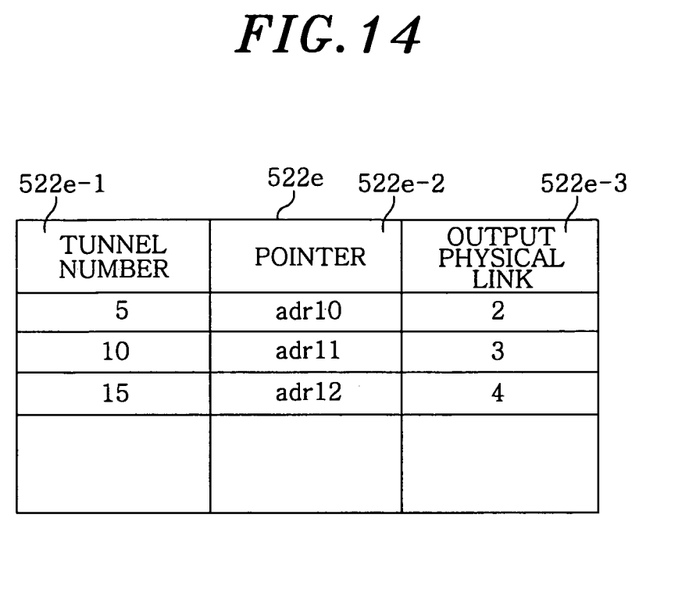
FIG. 14 shows another configuration of a search table used for downlink communications in the gateway.
Figure 15:
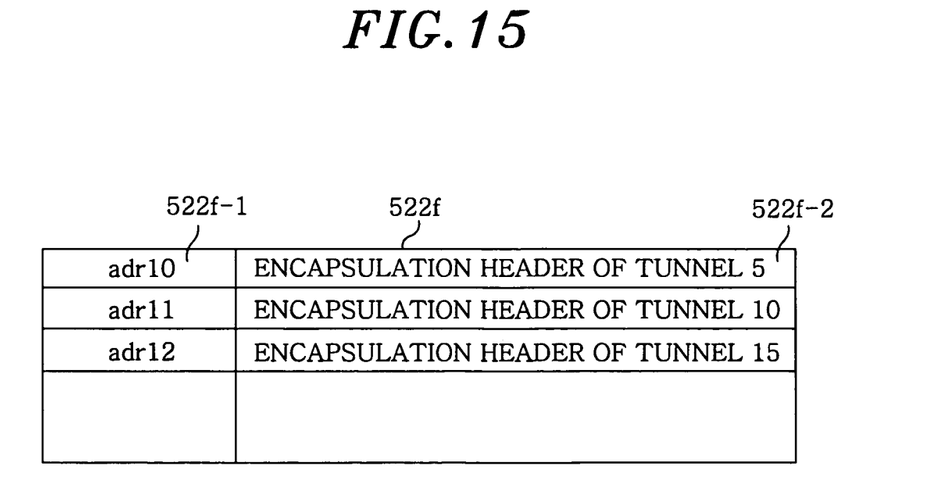
FIG. 15 shows still another configuration of a search table used for downlink communications in the gateway.

In this case, as shown in FIG. 13, FIG. 14 and FIG. 15, the search table 522 used for the downlink communications is logically divided.

The table 522d shown in FIG. 13 (which is a part of the search table 522) stores a destination IP address 522d-1 and a tunnel number 522d-2 in a corresponding manner.

The table 522e shown in FIG. 14 (which is a part of the search table 522) stores, in a corresponding manner, a tunnel number 522e-1, an address pointer 522e-2, and an output physical link 522e-3.

The table 522f shown in FIG. 15 (which is a part of the search table 522) stores an address 522f-1 and an encapsulation header 522f-2 in a corresponding manner.

In the uplink communications, the path ID 522a-1 was used as a search key for retrieving the search table 522a shown in FIG. 10.

Meanwhile, in the downlink communications, the GW 1, which has received a packet from the ISP 7 via the IP in IP tunnels 70-1 to 70-4, terminates the external IP header 710 of the IP in IP tunnel packet 700 shown in FIG. 6, and then uses the destination IP address that is set in the internal IP header 720 as a search key.

First, in the search table 522d shown in FIG. 13, the destination IP address 522d-1 is used as a search key to acquire its corresponding tunnel number 522d-2.

Next, the search table 522e shown in FIG. 14 is searched. The search key for the search table 522e is the tunnel number 522e-1 (here, the acquired tunnel number 522d-2). As a result of search, the output physical link (i.e., its number) 522e-3 and the address pointer 522e-2 for the search table 522f shown in FIG. 15 are acquired.

Finally, the search table 522f shown in FIG. 15 is searched. As a result, the encapsulation header 522f-2 for use in the corresponding GRE tunnels 60-1 to 60-7 established between the GW 1 and the BS 2 is acquired from the field of the encapsulation header which corresponds to the address value 522f-1 represented as the address pointer 522e-2 that is acquired from the search table 522e shown in FIG. 14.

As explained so far, the network system of this embodiment has following functions: [1] on the radio access network side, an individual tunnel is established per mobile station for a wireless access to the mobile station 3; [2] also, an individual tunnel corresponding to each ISP is established for an access between the GW 1 and the ISP 7 (core network side); and [3] interworking between the tunnel on the radio access network side and the tunnel on the core network side is performed by using the table within the GW 1.

Here, the functions [1] and [2] can be realized, for example, based on the standard of the network reference model which is established by the WiMAX Forum. In addition, other functions except for the tunnel's interworking function in the GW 1, e.g., the sequence for the initial access shown in FIG. 12 or the flow for packet processing by tunneling, can be realized based on the same standard.

Meanwhile, the tunnel's interworking function in the GW 1 related to the function [3], more particularly, packet distribution correspondingly for interworking between the tunnel on the access side and the tunnel on the core side in the GW 1, the contents of the table for interworking and the like, are key features of this embodiment.

Therefore, characteristic configurations of this embodiment are employed to realize the tunneling processing on the radio access network side, interworking between tunnels by using the table in the GW 1, and tunneling on the ISP side. Further, the configurations of this embodiment are employed to realize an indirect ISP access via another ISP, and interworking between tunnels on the access network side and the core network side.

As one configuration example, a direct system configuration example is illustrated. In the direct system, a packet is transmitted directly from the GW 1 to the target ISP.

More specifically, in this example, the GW 1 for interconnecting different networks is configured as follows.

The GW 1 has a function of interconnecting a first network (in this example, the network using the BS 2) which provides a wireless access function to the mobile station 3 and a second network (in this example, the network using the ISPs 7-1 to 7-4) which provides a network access function to the mobile station 3.

In the first network, the GW 1 establishes a first tunnel (in this example, two or more different GRE tunnels 60-1 to 60-7) between itself and the BS 2 (which performs wireless communications with the mobile stations 3) accessing one or more mobile stations 3 via wireless communications, for transmission of different packets to the respective mobile stations 3.

The GW 1 establishes a second tunnel (in this example, the IP in IP tunnels 70-1 and 70-4 where direct packet transmission is performed) between itself and the second network for packet transmission.

The GW 1 has a function of interworking the first tunnel with the mobile station 3 (e.g., the table for interworking each mobile station 3 with a path ID of the first tunnel).

The GW 1 has a function of interworking the second tunnel with the first tunnel (in this example, the search table 522 for interworking them).

Further, a configuration example of the indirect system is illustrated. In the indirect system, in order to transmit a packet from the GW 1 to the target ISP, the GW 1 accesses the target ISP via (through) another ISP's network.

Specifically, in this example, the GW 1 for interconnecting different networks is configured as follows.

The GW 1 has a function of interconnecting a first network (in this example, the network using the BS 2) which provides a wireless access function to the mobile station 3 and a second network (in this example, the network using the ISPs 7-2 and 7-3 corresponding to the target ISP) which provides a network access function to the mobile station 3, via a third network (in this example, the network using the ISP 7-1 corresponding to the different ISP).

The third network interworks with the second network including at least one different network.

In the first network, the GW 1 establishes the first tunnel (in this example, two or more different GRE tunnels 60-1 to 60-7) between itself and the BS 2 (which performs wireless communications with at least one mobile station 3) accessing at least one mobile station 3 via wireless communications, for transmission of different packets to the respective mobile stations 3.

The GW 1 establishes the second tunnel (in this example, the IP in IP tunnels 70-2 and 70-3 where indirect packet transmission is performed) between itself and the second network for packet transmission via the third network.

The GW 1 has a function of interworking the first tunnel with the mobile station 3 (e.g., the table for interworking each mobile station 3 with a path ID of the first tunnel).

The GW 1 has a function of interworking the second tunnel with the first tunnel (in this example, the search table 522 for interworking them).

Here, in the direct and indirect systems, the GW 1 may use the same configuration in relation to, e.g., the actual table contents.

In this example, by tunneling only between the GW 1 and the target ISP, for instance, a communications packet can access the target ISP only through the network without going through special processing in a different ISP network.

Also, in the second network, the GW 1 of this example can establish at least two different tunnels between network devices that are provided in the second network.

Moreover, for packet transmission in the upstream and downstream directions, a configuration example, which shows the operation in the GW 1 to perform transmission via tunnels interworked with reference to the table within the GW 1, will be described.

By referring to the table that interworks the second tunnel with the first tunnel, the GW 1 interworks the first tunnel with the second tunnel in one-to-one correspondence. In addition, the GW 1 transmits a packet, which is sent by using the first tunnel, to the second network by using the second tunnel that is interworked with the corresponding first tunnel. Moreover, the GW 1 transmits a packet, which is sent from the second network by using the second tunnel, to the first network by using the first tunnel that is interworked with the corresponding second tunnel.

As described above, the GW 1 of this example for interconnecting MNO with MVNO can perform user authentication appropriately between itself and the authentication server 71 provided by the MVNO with which the user enters into a contract and to which the user belongs. Also, since a tunnel for packet transmission is established between the GW 1 and the HA 72 that is provided at each MVNO, it is possible to transmit a packet appropriately to the network of the MVNO to which the user who sends the corresponding packet belongs. For instance, it is possible to appropriately distribute a packet from the MNO to the MVNO to which the user who sent the corresponding packet belongs.

Further, the GW 1 of this example has the function of the network access means for interconnecting the first network with the second network, the function of the first tunnel establishment means for establishing the first tunnel, the function of the second tunnel establishment means for establishing the second tunnel, the function of the tunnel-mobile station connecting means for connecting the first tunnel with the mobile station, the function of the tunnel-to-tunnel interworking means for interworking the second tunnel with the first tunnel, and the function of the transmission control means for performing packet transmission processing from the first network side (the first tunnel side) to the second network side (the second tunnel side) or from the second network side (the second tunnel side) to the first network side (the first tunnel side).

Here, the configuration of the system or apparatus of the present invention is not necessarily limited to the above-described embodiments, but may have various configurations. Also, the present invention may be provided, for example, as a method or system for performing processing related to the present invention, or as a recording medium that records a program or a corresponding program to realize such a method or system, or as any kind of system or apparatus.

Moreover, the application fields of the present invention are not necessarily limited to those described above, but include all kinds of fields.

Also, as for any kind of processing that is performed in the system, apparatus or the like of the present invention, e.g., in hardware resources including a processor, a memory and the like, it is possible to use a configuration where the processor executes a control program stored in a read only memory (ROM) for control, or, for example, each functional means may be configured as an independent hardware circuit for performing the corresponding processing.

In addition, the present invention may be recognized as a computer-readable recording medium such as a floppy (registered trademark) disk or compact disc (CD)-ROM which stores the control program, or the program itself, or may perform the processing related to the present invention by inputting the corresponding control program from the corresponding recording medium to the computer and executing in the processor.

While the invention has been shown and described with respect to the embodiments, it will be understood by those skilled in the art that various changes and modifications may be made without departing from the scope of the invention as defined in the following claims.

What is claimed is:

1. A gateway for interconnecting different networks, comprising:
   a network access means for interconnecting a first network that provides a wireless access function to one or more mobile stations and each of distinct second networks which provide an internet access function to the mobile stations, wherein said each of the second networks includes a networking device connected to an internet;
   a first tunnel establishment means for establishing, in the first network, first tunnels between the gateway and a base station accessing the mobile stations via wireless communications, for transmission of different packets to the respective mobile stations, wherein the first tunnels are established in accordance with a tunneling protocol;
   a second tunnel establishment means for establishing second tunnels between the gateway and respective networking devices of the second networks, for packet transmission;
   a tunnel-mobile station connecting means for connecting the first tunnels with the mobile stations; and
   a tunnel-to-tunnel interworking means for interworking the first tunnels with the second tunnels,
   wherein the tunnel protocol is a Generic Routing Encapsulation (GRE), and
   wherein the second tunnels are IP-in-IP tunnels.

2. The gateway of claim 1, wherein the network access means is allowed to interconnect the first network with the second networks via a third network, and
   wherein the second tunnel establishment means is allowed to establish the second tunnels between the gateway and the second networks in a manner that the second tunnels go through the third network.

3. The gateway of claim 1, further comprising:
   a transmission control means, which interworks the first tunnels with the second tunnels in one-to-one correspondence with reference to interworking of the tunnel-to-tunnel interworking means, transmits a packet sent by using one of the first tunnels to corresponding second network by using one of the second tunnels that is interworked with said one of first tunnel, and transmits a packet sent by using one of the second tunnels from the second networks to corresponding first network by using one of the first tunnels that is interworked with said one of second tunnels.

4. The gateway of claim 2, further comprising:
   a transmission control means, which interworks the first tunnels with the second tunnels in one-to-one correspondence with reference to interworking of the tunnel-to-tunnel interworking means, transmits a packet sent by using one of the first tunnels to corresponding second network by using one of the second tunnels that is interworked with said one of first tunnel, and transmits a packet sent by using one of the second tunnels from the second networks to corresponding first network by using one of the first tunnels that is interworked with said one of second tunnels.

5. The gateway of claim 1, wherein the tunnel-to-tunnel interworking means includes a table for storing identifiers of the first tunnels and identifiers of the second tunnels in one-to-one correspondence in interworking the first tunnels with the second tunnels.

6. The gateway of claim 2, wherein the tunnel-to-tunnel interworking means includes a table for storing identifiers of the first tunnels and identifiers of the second tunnels in one-to-one correspondence in interworking the first tunnels with the second tunnels.

7. The gateway of claim 2, wherein the third network includes a networking device connected to the internet.

* * * * *